Patented Nov. 15, 1927.

1,649,562

UNITED STATES PATENT OFFICE.

JOHN F. BLYTH, OF NEWARK, AND CARLETON ELLIS, OF MONTCLAIR, NEW JERSEY.

ARSENICAL PRODUCT AND PROCESS OF MAKING SAME.

No Drawing. Application filed January 3, 1925. Serial No. 314.

This invention relates to a process of making compounds or of compositions containing arsenic, suitable for use as an insecticide and relates especially to a simplified procedure of manufacture which enables such products to be made in a cheap and efficient manner. The invention will be discussed particularly with reference to the preparation of calcium arsenite or compositions containing this or related arsenites. In its preferred form the product contains an excess of hydrated lime over that required to form a normal arsenite, (e. g. calcium arsenite) and also under certain conditions contains loosely combined water and for these and other reasons we consider it basic in character. The illustrative product is hereinafter referred to as "arsenite of lime" inasmuch as it is not pretended that the product is chemically pure.

An efficient insecticide, as we understand it, is one which is sufficiently stable not to decompose so fast as to burn the foliage of the plant, and yet sufficiently unstable to break down inside the organism of the insect. The percentage of water soluble arsenic compounds in an insecticide is generally considered a criterion of its burning power on the foliage. It is desirable that a small amount of water soluble arsenic compounds be present especially for use against insects like the cotton boll weevil which puncture the foliage and suck the juice (as distinguished from insects which actually consume the foliage). Insects of the sucking type are poisoned partly by the water soluble arsenic compounds which dissolve in the drops of dew or rain on the foliage, and partly by the fine particles of insoluble arsenic compounds suspended in these fine drops of water when the insects drink them.

By means of this invention it is possible to prepare a product unusually low in water soluble arsenic compounds, and to control to a large extent the stability and rate of decomposition of the product both on the foliage and within the organism of the insect. All the arsenic ingested by the insects is not assimilated, but a portion is voided in the excrement. The percentage amount of arsenic assimilated depends on the properties of the arsenical compound used. The arsenites as a class are more energetic than the arsenates.

Arsenite of lime, or its related compound London purple, enjoyed quite wide usage some years ago, but has since fallen into disrepute owing—as we understand it—to the fact that the material then produced varied widely in physical and chemical properties, and particularly because the material as then produced contained comparatively large amounts of water-soluble arsenic compounds and was inclined to burn the foliage.

Certain arsenicals formerly used were originally residues from the manufacture of magenta. They consisted largely of arsenite and arsenate of lime together with inert mineral and coloring matter; and were sold under the name of London purple. Later the material was produced by heating together arsenic trioxide and lime suspended in water. This method required continued heating and agitation for a long period of time, and the precipitate thus formed tended to occlude soluble arsenic compounds. The method was therefore expensive because of the large amount of water used, which must subsequently be removed by decantation, filtration, or evaporation; and also because of the expense of purchasing and operating the elaborate equipment required for precipitation, elimination of water, drying, grinding etc. Furthermore, the product obtained was unsatisfactory because the continued stirring and heating of the precipitate in aqueous suspension tended to form dense, gritty, aggregates which still occluded soluble arsenic compound as mentioned above.

In accordance with the present invention it is possible to carry out a process of slaking quick lime in the presence of arsenic trioxide with a certain proportion of water in a manner which yields a product unusually low in water-soluble arsenic compounds and in the form of a finely-divided voluminous powder which for most commercial requirements needs no further drying but which may be passed through a disintegrator or air separator before packaging if desired.

Our investigations have shown that conditions of manufacture must be varied to suit the physical and chemical properties of the lime, or arsenic trioxide, the type of apparatus employed, and the properties desired in the final product.

In reactions of this nature between comparatively insoluble substances the speed and completeness of the reaction is, in general, proportional to the amount of surface exposed to the reaction. For this reason, therefore, we prefer to employ lime which is either in a state of fine subdivision, or which is reducible to this state during or by means of the reaction.

We consider a light porous lime which has been carefully burned—but not overburned—to be preferable. Since a lime of this type is easily crushed or pulverized, we ordinarily prefer to grind it to about 100 mesh, to mix it intimately with the required amount of arsenic trioxide and then to add the necessary amount of water or aqueous material, either all at once or gradually, as mentioned below. Substantially the same effect of exposing a large surface to the reaction would be obtained by using a lime of the above type (in which the rate of penetration of the water is greater than the rate of hydration) in the form of comparatively coarse lumps, but which would break down and disintegrate during hydration and thus expose a large surface to the reaction. A somewhat similar effect would be obtained by first completely or partially hydrating the lime and then adding the arsenic trioxide and balance of the water (if any). This method may even be so regulated as to yield a putty-like mass which is subsequently dehydrated by the addition of more quick lime.

The arsenic trioxide which we prefer to use may be any of the commercial grades, either crude or resublimed but preferably should contain only a small percentage of material which does not pass through a 100 mesh screen. Any large particles of arsenic trioxide are liable not to be completely reacted upon during the period of reaction. For this reason, we recommend that the arsenic trioxide employed contain less than two per cent of material which does not pass a 100 mesh screen. It is not beyond the scope of this invention to prepare arsenite of lime from arsenic trioxide containing a considerable percentage of particles which do not pass through a 100 mesh screen. However, as a precautionary measure we recommend either that a grade of arsenic trioxide containing less than a 2 per cent residue on a 100 mesh screen be employed, or that the arsenic trioxide be ground or air-separated so as to conform to this suggestion before treatment with the water. From an economical standpoint it would probably be cheaper to separate the coarse particles of arsenic trioxide by screening or air separating machinery and then to reduce the coarse particles to the desired size, but on the other hand this does not preclude the procedure of grinding the entire amount of arsenic trioxide and also the quick lime together in a machine such as a ball mill or tube mill and to add the water to this mixture in the same machine. This would eliminate to a large extent the dust incidental to air separating and screening operations. Suitable vents should be provided in the ball or tube mill to take care of the large amount of steam generated during the reaction.

Regarding methods of mixing the three active ingredients: quick lime, arsenic trioxide, and water, it should be borne in mind that it is preferable to expose as large a total surface as possible to the reaction, and that it is desirable or important to secure a thorough and intimate mixture of the lime and arsenic trioxide before the reaction begins. We therefore ordinarily prefer to reduce the lime and arsenic trioxide to a fine state of subdivision and thorough mixture and to add the proper amount of water rapidly to this mixture. The mixture will soon become hot, steam will be evolved for several minutes and on cooling a finely divided, voluminous, white powder will be obtained.

This reaction may be carried out in batches in apparatus similar to a ball mill or batch type lime hydrator, or it may be carried out continuously in a continuous lime hydrator. The batch method simplified the weighing and processing operations, but the continuous method offers the usual economies of a continuous process.

While we usually prefer to mix the arsenic trioxide and lime together in the dry state, and then to add the water to the mixture, still we have also secured good results by suspending the arsenic trioxide in the water and adding this suspension to the lime. But we have noticed that the water disperses into the mass very rapidly and therefore might tend to deposit the arsenic in layers on the surface and this arsenic might not be evenly distributed throughout the mass before the reaction started. Therefore we ordinarily prefer to mix the arsenic trioxide and quick lime in the dry state and to spray or pour the water into this mixture. However, under certain circumstances; as for example if it was found to be practical to separate the coarse particles of arsenic trioxide by screening and to dissolve these particles in the water before adding it to the lime, or if when using a "flour-like" or crude arsenic which resists wetting it was found to be advisable to suspend the arsenic trioxide in the water we have found that it is practical to do so. Under certain conditions advantageous results would be obtained by suspending the arsenic trioxide in water, or water containing a suitable dispersing agent, and increasing the degree of dispersion by means of a colloid mill or otherwise. In this way, an arsenic trioxide approaching the colloidal state would be obtained which because of its extremely fine subdivision and because of the very great surface exposed, would react very energetically and completely. This procedure will be particularly valuable in preparing arsenite of lime products having a very high percentage of arsenic and when unusually low water soluble arsenic contents are desired.

It may be noted at this point that the insecticide trade in general objects to the finely divided arsenic trioxide—as for instance certain grades of Japanese arsenic—and to crude arsenic not so much because of the small percentage of soot and other impurities which it contains, but principally because it resists wetting and tends to flocculate and collect in aggregates which cause mechanical troubles and which do not readily enter into the reaction. This property is particularly objectionable in arsenic trioxide to be used for the manufacture of arsenic acid by the nitric acid method. On the other hand, for the purpose of making arsenite of lime by means of this invention it is not only possible to use these cheaper grades of arsenic trioxide, but by reason of their fine division, they may actually be considered preferable.

In order to obtain an extremely low water-soluble arsenic content in the arsenite of lime, and to make the reaction go more nearly to completion it may be useful in some cases to dissolve as much as possible of the arsenic trioxide in the water before adding it to the lime. The amount of water required under the conditions of this invention usually varies from one-half to one and one-half times the weight of the arsenic trioxide used. It is obviously impossible to dissolve move than a small percentage of the arsenic trioxide in this amount of water. The solubility can however, be greatly increased by the addition of certain substances to the water, among others we might mention hydrochloric acid, sodium acetate, and sodium hydroxide. Hydrochloric acid would yield calcium chloride in the finished product and this compound—because of its deliquescent properties—would tend to make the arsenite of lime adhere better to the foliage, and might therefore be considered a desirable ingredient.

As an illustration of the methods embraced under the present invention, the following examples will serve:

60 parts by weight of commercial arsenic trioxide which contained approximately 5 per cent of particles which would not pass a 160 mesh screen and 85 parts by weight of a porous quick lime made from marble crushed to 40 mesh were thoroughly mixed together, 30 parts by weight of water were added rapidly. The mixture was agitated for about a minute at the end of which time the mass had become appreciably warmer. During this short time a distinct coating phenomenon was noticed. The particles tending to collect in a formation somewhat like frost or coral. Agitation was discontinued at this point. The mixture soon began to steam, and continued steaming and swelling for three to five minutes. After standing for about one hour a sample of the product was screened through a 40 mesh screen. All passed through, it was then tried on a 160 mesh screen and a residue of 1.5 per cent was obtained. Examination indicated that this residue consisted partly of grit and impurities in the lime, but principally of coarse particles of undecomposed arsenic trioxide. An analysis of the material which passed through the 160 mesh screen showed that it contained 36.9 per cent total arsenic pentoxide, soluble arsenic equivalent to 1.59 per cent arsenic pentoxide, 0.78 per cent moisture which dropped to 0.13 per cent several days later, and had an apparent density of 0.618.

When the same quantities of arsenic trioxide and lime were used, but both were screened through 160 mesh and the water increased to 40 parts by weight, the water soluble arsenic trioxide decreased to 0.56 per cent, the moisture increased to 0.38 per cent and the apparent density decreased to 0.562. In other words, we had obtained a more fluffy product with a lower water soluble content. We were surprised to note that the maximum temperature reached in this particular experiment was the unexpectedly high point of 155° C.

Duplicating the above experiment with the exception of increasing the water to 44 parts by weight we obtained a product having about the same water soluble arsenic trioxide content 0.56 per cent, the moisture increased to 0.70 per cent and the apparent density decreased to 0.553. The maximum temperature in this case was 135° C.

A further increase in the amount of water to 48 parts by weight increased the water soluble arsenic trioxide to 1.54 per cent, the moisture increased to 2.1 per cent and the apparent density decreased to 0.458. The maximum temperature reached was 112° C.

54 parts of water by weight decreased the water soluble arsenic trioxide sharply to 0.60 per cent, the moisture increased to 3.74 per cent and the apparent density remained about the same 0.460. The maximum temperature reached was 108° C.

60 parts by weight of water decreased the water soluble arsenic trioxide to the very low point of 0.25 per cent. The moisture increased to 6.73 per cent. The apparent density declined slightly to 0.490. The maximum temperature in this case was only 103° C.

The above quantities of 60 parts by weight of arsenic trioxide, and 85 parts by weight of quick lime when expressed in terms of molecular weights show approximately one molecule of arsenic trioxide to nearly five molecules of calcium oxide.

The products obtained from the above series of examples were all voluminous, free flowing, apparently dry, powders. Even the last example mentioned which yielded a product containing nearly seven per cent of water passed readily through a screen of 160 mesh without any signs of packing or sticking.

These facts of large excess of lime, and relatively large amount of moisture in an apparently dry product, indicate that a part or all of the water is present in a loosely combined form, as for example in a basic calcium arsenite, water of crystallization, or possibly so-called water of constitution.

The above series of examples show that there are, among others, two principal factors tending to drive the reaction to completion and yield products low in water-soluble arsenic compounds. One factor is the high temperature which may be obtained under certain conditions, as for example using a small quantity of water, or by adding the water gradually in the form of a thin stream while agitating the mass. This procedure may be varied by adding the water slowly at first until the arsenic trioxide has combined with the necessary amount of lime and then the balance of the water may be added rapidly so that the excess quick lime will be obtained in the form of a light and fluffy hydrate, or the procedure may be reversed so as to have the high temperature come at the end of the reaction. The effect of high temperature may be increased by external heating if necessary or the high temperature may be continued for some time by stirring the material in heat insulated receptacles or otherwise, or the reaction may be performed under pressure at a high temperature thereby greatly increasing the solubility of arsenic trioxide in the water.

The second factor tending to yield products low in water soluble arsenic compounds is that of using a relatively large amount of water (as in the last example cited above). In this case we attribute the low water-soluble arsenic content to the fact that the comparatively low temperature and relatively large amount of water yielded a very light, fluffy, and finely divided product and that the period of reaction was considerably longer. This tendency may be carried further by the use of heat interchangers—whereby the latent heat in the waste steam could be used to heat the air that is circulated through some continuous hydrators to remove the last traces of moisture. (This would allow the use of more excess water with a consequent production of a lighter product and one having an even lower water soluble arsenic trioxide content.)

Other factors tending to lower the soluble arsenic content are: finely divided raw materials, or materials which are of such a nature as to subdivide readily during the reaction; complete and rapid agitation; thorough mixing before the reaction starts and while the reaction is progressing, the presence of soluble salts in the lime or added intentionally which tend to increase the solubility of the arsenic trioxide in the water or to discharge any colloidal matter which might occlude arsenic trioxide, or in short any procedure which will tend to expose the maximum possible surface to the reaction.

Regarding the effect of the various modifications on the physical and chemical properties of the product, the following generalizations can probably be made:

While there is no definite correlation between the apparent density of the quick lime used, and the arsenate of lime produced, in general we have found that the lighter and more porous limes yield a lighter and fluffier product. The lighter and more porous limes in general have a higher rate of penetration for water. That is to say, the water penetrates faster than the lime hydrates. Limes of this character yield a light and fluffy product, because such a lime usually has a high available lime content and would therefore tend to yield a greater number of particles of hydrated lime with a consequent disintegration and breaking down of aggregates during the reaction.

We consider the available lime content rather than the total lime content is a factor of importance. By available lime content we mean that portion of the total lime content which is readily soluble in water, and which is therefore capable of entering into the reaction. This can be determined by the Scaife method as adopted by the American Society for Testing Materials.

In summing up the relationship between the properties of the quick lime used and the properties of the arsenite of lime product obtained, we consider the preferable kind of quick lime is one having a low volatile content, a large percentage of pore space, a high available lime content, and ground to such size that a minimum number of aggregates of incompletely hydrated material will be obtained at the end of the reaction. The degree of grinding depends on the porosity and available lime content of the lime. In some cases it will not be necessary to grind at all, but on the other hand when using a dense or overburned lime, or one containing a high percentage of magnesia or silica, or a lime which has been underburned and contains unburned cores, it will be necessary to compensate for these undesirable properties by grinding the lime to such a state of fineness before the reaction, that no aggregates of undecomposed or vitreous material will remain at the end of the reaction.

We have observed that notably light products are ordinarily obtained by adding the water rapidly to the arsenic trioxide and lime. If, however, it is desired to obtain a dense material or one which will decompose more slowly on the foliage of the plant, etc. we have found that such a product can be obtained by adding the water in the form of a thin stream or spray; the arsenic trioxide and quick lime being in a state of thorough agitation and ground to a suitable size as mentioned above. This addition will usually take place over a period of fifteen minutes to one-half hour, but may be varied beyond these limits, depending on the product desired, the quality of the lime, the type of machinery employed, etc.

The third raw material entering into this process is the excess water which we have found is needed to satisfy the chemical affinity of the lime and arsenic trioxide under the conditions of the reaction, and necessary to prevent the heat of the reaction from raising the temperature of the mass—either in its entirety or locally—to such a point that incompletely hydrated or so called "burnt" aggregates are obtained at the end of the reaction, with the resultant formation of a comparatively dense product. On the other hand we prefer to maintain the temperature at the maximum point of reactivity consequent on yielding arsenite of lime of low water-soluble content of arsenic.

The amount of this water has been found to vary between comparatively wide ranges. For example in the case of preparing a dense and more stable form of arsenite of lime by adding the water to the arsenic trioxide and quick lime as mentioned above, it was found that if the rate of addition was so slow that most of the excess heat was dissipated by radiation, no excess water was needed. On the other hand in commercial batches of one ton or more, or continuous manufacturing at the rate of three tons per hour or more, using a high calcium quick lime having a total calcium oxide content of 96 percent or better, a porous structure, and an available calcium oxide content of 90 per cent or better, an amount of excess water equal to approximately the weight of the arsenic trioxide may be required. This will vary with the rate of production and with variations due to the lime, etc.

We prefer, however, to determine the amount of water needed (for each particular grade of lime and for each particular method of carrying out the reaction) to develop and preserve as far as possible the so-called fatness of colloidal matter present in the quick lime, thereby obtaining a dry pulverulent product at the end of the reaction.

Under certain conditions it may be desirable to first add a part or all of this excess water to the quick lime thus partially or completely hydrating it and then to add the arsenic trioxide to this mixture. This procedure would probably be desirable for example, if it were found to be desirable to use a porous lime in form of lumps or coarsely ground. The preliminary hydration would disintegrate and open up the lumps and thereby facilitate the subsequent reaction with the arsenic trioxide. A precipitated lime sludge such as is obtained from causticizing plants might be advantageously employed in this manner.

Another modification in the use of the excess water lies in the fact that when using a lime which is dense or overburned, or for any other reason tends to react slowly at first but rapidly at the end, a lighter and fluffier product may sometimes be obtained by adding the excess water at the end of this reaction and allowing the material to age for some time before grinding. In this way the gritty aggregates are broken down and more completely hydrated. We have noticed that the quick limes which react the most violently with water do not necessarily react the most violently with arsenic trioxide. For this reason a smoother and more uniform reaction with a lime of the violent type might possibly be obtained by adding the excess water after rather than before the arsenic trioxide, or together with the arsenic trioxide.

Still another modification which tends to yield a light and fluffy product is to use sufficient excess water to yield a putty-like mass after the arsenic trioxide is added to the lime, and then to add sufficient quick lime to take up or drive off the excess water. Or the conditions may be reversed and the arsenic trioxide added to a putty composed of lime and water; in both cases the amounts of material being so regulated as to yield a substantially dry pulverulent mass at the end of the reaction.

All these various modifications are designed to correspond with the physical and chemical properties of the various quick limes encountered. The wide variation in the properties of quick limes are well known. See for example United States Patent 1,410,087.

While we have confined most of our statements to the use of a lime which was composed principally of calcium oxide, this is not to be interpreted as precluding the addition of other ingredients before, during or after the reaction; as for example substances like chalk, underburned, or air slaked lime, agricultural or dolomitic lime etc. which would affect the density of the final product and influence the rate of decomposition, or substances such as Bentonite, casein, dextrin, calcium oleate or stearate, fatty acids, and other compounds which would tend to yield a product which would adhere better to the foliage, or substances such as sodium fluosilicate, Paris green, copper compounds, sulphur, calcium arsenate or arsenic acid and other compounds which would increase or diversify the insecticide or fungicide properties of the product.

To recapitulate, the present invention is concerned with the production of arsenical material adapted for use as insecticides, in particular as a boll weevil killer, such arsenical material comprising a compound of a base or alkaline earth, e. g. calcium, magnesium, barium, strontium oxides etc. or mixtures of these with arsenic trioxide, arsenious acid or white arsenic, a preponderating amount or excess of the base preferably being present to create the tendency to formation of basic arsenites; the product preferably being in a pulverulent form, preferably bulky or voluminous and very finely-divided in order to have good covering or distributing properties; preferably containing the preferred excess of base, e. g. calcium, in the form of hydrate or a mixture of hydrate and oxide, or in some cases an "over hydrated" calcium hydrate, (that is, containing water in excess of combining requirements) not enough water being present, however, to detract materially from the apparent "dryness" of the powdery product; the insecticidal composition containing a substantial and effective proportion of the arsenite but having the greater part of it, preferably 98 to 99 per cent or more, in a water-insoluble form. In the preferred embodiment we do not wish to exceed 2 per cent of water-soluble arsenic (expressed as pentoxide) and in general not over 1 per cent of the water-soluble poison, which under more favorable conditions of manufacture in accordance with our process may fall to 1/2 per cent or less. A water-soluble content between 1/2 per cent and 1 per cent is an effective range. The total arsenic content may vary within wide limits depending on the particular application in hand. It may range from over 40 per cent to under 10 per cent (expressed as pentoxide).

The invention also contemplates the process of making such products, e. g. arsenite of lime of low water-soluble arsenic content, by reacting on quick lime, calcium oxide, partially hydrated lime etc. with arsenious oxide or acid, white arsenic and ores containing it, such arsenic body being in a state of reactive fineness, a condition which may be secured by grinding the arsenic body alone or with the quick lime etc. by dispersion in water or by solution in an appropriate solvent. The reaction may be begun and finished in the presence of water or simply the finishing stages may be carried out in water (or steam). Preferably the use of large proportions of water should be avoided, just enough water being used with quick lime to obtain at the close of the reaction an apparently dry product of low water-soluble arsenic content.

Sub-processes within the scope of the foregoing involve grinding together quick lime and arsenic trioxide and adding a limited proportion of water to the ground mix, also grinding together quick lime and wet arsenic trioxide, or mixing finely-divided quick lime with finely-divided arsenic trioxide and adding water; preferably allowing the temperature to rise to a maximum in order to finish the reaction expeditiously and effectively, and applying external heat if necessary to reduce the content of water-soluble arsenic. Any excess of quick lime preferably employed remains in the mix as "co-slaked" that is simultaneously slaked calcium hydrate.

What we claim is:—

1. The process of making arsenical compounds adapted for use as insecticides which comprises reacting on quick lime in excess with white arsenic in a finely divided state, in the presence of moisture, and agitating while the reaction is progressing whereby an insecticide containing arsenite of lime as the essential constituent and having at most between 1/2 and 1 per cent of water-soluble arsenic (figured as pentoxide) is obtained the total amount of such moisture present being so adjusted that the quantity thereof remaining chemically uncombined in the product shall be so small as to leave a pulverulent solid product of dry appearance.

2. The process of making arsenical compounds adapted for use as insecticides which comprises reacting on basic calcium material in excess with white arsenic in a finely divided state, in the presence of moisture, and agitating while the reaction is progressing whereby an insecticide containing arsenite of lime as the essential constitutent and having less than 2 per cent of water-soluble arsenic (figured as pentoxide) is obtained, the total amount of such moisture present being so adjusted that the quantity thereof remaining chemically uncombined in the product shall be so small as to leave a pulverulent solid product of dry appearance.

3. The process of making arsenical compounds adapted for use as insecticides which comprises reacting on quick lime in excess with white arsenic (most of which passes a 100 mesh screen), in the presence of a limited amount of water, and agitating while the reaction is progressing whereby an insecticide containing arsenite of lime as the essential constitutent and having less than 2 per cent of water soluble arsenic (figured as pentoxide) is obtained the amount of such water being sufficiently low as to leave a dry-appearing pulverulent product at the end of the operation.

4. The process of making arsenical material which comprises reacting on finely-divided white arsenic (arsenious oxide) with an excess of finely-divided quick lime in the presence of an amount of water only sufficient to yield at the close of the reaction a substantially dry powder comprising arsenite of lime and hydrated lime.

5. The process of making arsenical material which comprises reacting on finely-divided white arsenic (arsenious oxide) premixed with an excess of finely-divided quick lime in the presence of an amount of water only sufficient to yield at the close of the reaction a substantially dry powder comprising basic arsenite of lime and hydrated lime, the content of water-soluble arsenic (figured as pentoxide) being approximately between ½ and 1 per cent.

6. The process of making arsenical material which comprises reacting on finely-divided white arsenic (arsenious oxide) with an excess of finely-divided quick lime in the presence of water sufficient to yield at the close of the reaction a substantially dry powder comprising arsenite of lime and hydrated lime, and having a content of water-soluble arsenic (figured as pentoxide) being less than 2 per cent.

7. The process of making arsenical compounds adapted for use as insecticides, which comprises mixing finely-divided quick lime with finely divided arsenic trioxide and adding a small proportion of water.

8. The process which comprises the step of grinding together quick lime and white arsenic trioxide.

9. The process which comprises grinding lime in excess and white arsenic together and adding water.

10. As insecticidal material a mixture of calcium arsenite and calcium hydroxide in a pulverulent state, the content of water-soluble arsenic being below 2 per cent (figured as pentoxide).

11. As insecticidal material a mixture of basic calcium arsenite and calcium hydroxide in a pulverulent state and low in water-soluble arsenic.

12. As an insecticide a dry-appearing pulverulent mixture of calcium arsenite of low water soluble arsenic content admixed with co-slaked calcium hydroxide.

13. As an insecticide a dry-appearing pulverulent mixture of calcium arsenite admixed with calcium hydroxide, the soluble arsenic in said mixture being below 2% (figured as arsenic pentoxide).

14. A boll weevil killer consisting of basic arsenite of lime and hydrated lime, the water-soluble arsenic being under one per cent, insufficient water being present therein to destroy its pulverulent character, or to form a pasty or liquid mass.

15. The process of making arsenical compounds adapted for use as insecticides, which comprises mixing finely-divided quick lime with finely divided arsenic trioxide and adding an amount of water substantially less than the combined amounts of said solid components.

16. The process which comprises grinding lime in excess and white arsenic together and adding an amount of water substantially less than the combined amounts of said solid components.

17. The process which comprises grinding lime in excess and white arsenic together and adding an amount of water sufficient to bring about reaction between said solids, but insufficient to leave a pasty or liquid product.

JOHN F. BLYTH.
CARLETON ELLIS.